United States Patent

Clausnitzer et al.

Patent Number: 5,944,282
Date of Patent: Aug. 31, 1999

[54] LANDING SHOCK ABSORBER

[76] Inventors: Hans-Juergen Clausnitzer, Im Wiesengrund 3, D-27751 Delmenhorst; Johann Schweren, Lindenstrasse 16, D-28755 Bremen, both of Germany

[21] Appl. No.: 08/913,292
[22] PCT Filed: Mar. 4, 1996
[86] PCT No.: PCT/EP96/00906
  § 371 Date: Sep. 15, 1997
  § 102(e) Date: Sep. 15, 1997
[87] PCT Pub. No.: WO96/28344
  PCT Pub. Date: Sep. 19, 1996

[30] Foreign Application Priority Data

Mar. 15, 1995 [DE] Germany .......................... 195 09 245

[51] Int. Cl.⁶ .................................................. B64C 25/56
[52] U.S. Cl. ...................... 244/100 A; 244/101; 244/107
[58] Field of Search ........................... 244/100 A, 138 R, 244/101, 107

[56] References Cited

U.S. PATENT DOCUMENTS

| | | |
|---|---|---|
| 2,511,601 | 6/1950 | Smith . |
| 2,887,055 | 5/1959 | Bagdanovich et al. . |
| 2,974,912 | 3/1961 | Namsick . |
| 2,998,601 | 4/1961 | Namsick et al. . |
| 3,009,566 | 11/1961 | Oakley . |
| 3,266,757 | 8/1966 | Guienne . |
| 3,507,466 | 4/1970 | La Fleur . |
| 3,727,716 | 4/1973 | Jenkins . |
| 3,738,597 | 6/1973 | Earl et al. . |
| 4,312,484 | 1/1982 | Meisner . |
| 4,923,145 | 5/1990 | Broadhurst . |
| 5,421,610 | 6/1995 | Kavanaugh et al. . |
| 5,501,488 | 3/1996 | Saderholm et al. . |
| 5,582,428 | 12/1996 | Buchanan et al. . |

FOREIGN PATENT DOCUMENTS

| | | |
|---|---|---|
| 2224325 | 10/1974 | France . |
| 3323348 | 1/1985 | Germany . |

*Primary Examiner*—Charles T. Jordan
*Assistant Examiner*—Tien Dinh

[57] ABSTRACT

A landing shock absorber for aircraft including brake parachutes and comprising a landing cushion for creating damping upon impact of the aircraft, the landing cushion having an inflatable inner bag including a pressure-tight, plastically deformable sheet. The inner bag defines a plurality of inflatable air chambers, and at least one opening between the chambers for establishing communication between the chambers. The landing cushion further includes an outer bag enclosing the inner bag and having a greater internal volume that an internal volume of the inflatable air chambers of the inner bag when the chambers are inflated, the outer bag including a tear-resistant fabric defining a plurality of throttle openings therein.

6 Claims, 3 Drawing Sheets

LANDING SHOCK ABSORBER

FIELD OF THE INVENTION

The invention relates to a landing shock absorber for air loads or pilotless aircraft hereinafter both referred to as "aircraft", equipped with brake parachutes.

BACKGROUND OF THE INVENTION

In a known landing shock absorber of this type (DE 33 23 348 C2), the outer bag and inner bag are both formed from an airtight, plastically-deformable tubular sheet, with the two tubular sheets being inserted into one another, and the end of each sheet being reverse-drawn through the other end. Openings for the introduction of compressed gas into the inner and outer bag remain between the resulting four walls of the ends, which are reverse-drawn into one another; the degree of filling of the inner and outer bags can be set variably using valve elements. The ratio of gas inflations in the inner and outer bags is set as a function of parameters such as falling speed and weight of the air load or aircraft. The inner and outer bags can have different volumes.

In a landing shock absorber of this type, the landing shock damping is effected by the expansion of the cushion skins and the valves. This damping is relatively passive, so bouncing and toppling of the air load or aircraft during landing cannot be reliably precluded. Furthermore, lateral stability is relatively low upon impact.

SUMMARY OF THE INVENTION

It is the object of the invention to increase the lateral stability of a landing shock absorber of the type mentioned at the outset, and, at the same time, to reliably preclude toppling of the air load or aircraft. Moreover, the landing shock absorber is intended to be individually adaptable to its respective intended use, because its damping characteristic can be influenced simply, allowing it to achieve optimum function.

In accordance with the invention, the object is accomplished in a landing shock absorber for aircraft including brake parachutes and comprising a landing cushion for creating damping upon impact of the aircraft, the landing cushion having an inflatable inner bag including a pressure-tight, plastically deformable sheet. The inner bag defines a plurality of inflatable air chambers, and at least one opening between the chambers for establishing communication between the chambers. The landing cushion further includes an outer bag enclosing the inner bag and having a greater internal volume that an internal volume of the inflatable air chambers of the inner bag when the chambers are inflated, the outer bag including a tear-resistant fabric defining a plurality of throttle openings therein.

In the landing shock absorber of the invention, impact energy is essentially absorbed by the inner bag, which has multiple air chambers; the damping path can be determined by the extensibility of the inner bag sheet and the number of air chambers. Upon impact on the ground, the air chambers in the inner bag are tightly compressed, causing a specific overpressure to build up, which destroys the inner bag. The air exiting the air chambers is released in a defined manner via throttle openings in the outer bag, whereupon the overpressure is reduced in a controlled manner and with a time delay. This effects very good damping with a controllable damping path. The tightly-inflated air chambers of the inner bag offer high lateral stability during impact. The outer bag, which is slightly more expensive to produce, is made of a tear-resistant, tightly-knit fabric having throttle openings, and is up to 90% reusable, which helps to reduce operating costs.

The landing cushion (inner bag and outer bag) is simple to produce; only a (disk-shaped) cut of a fabric run is required, which is welded or stitched to form a balloon-like structure. The sheet or fabric is available commercially; the throttle openings are cut into the periphery, above the seam. The outer bag, whose volume is greater than the sum of all of the inflated air chambers of the inner bag, forms a sort of cylinder upon impact. The packing volume of the landing shock absorber is small, so complicated valves are not necessary.

Advantageous embodiments of the landing shock absorber of the invention, and modifications of the invention, are disclosed below.

In accordance with a preferred embodiment of the invention, the inner bag has defined tearing points that rupture when pressure peaks occur in the air chambers. Because of these tearing points in the inner bag, the tearing of the air chambers can be controlled by the overpressure building up upon impact, and can also be set to be successively graduated, so the damping path can be influenced with high precision over time.

In accordance with a practical embodiment of the invention, the inner bag is inflated with low filling pressure; a few tenths above atmospheric pressure suffice. The inflation process can therefore be effected quickly and with only a small supply of compressed gas, which saves space.

In accordance with an advantageous embodiment of the invention, the landing cushion has a central fastening device that includes an inflation opening for securing the inner bag to the underside of the air load or aircraft. The central attachment of the inner and outer bags essentially compensates for the lateral stresses during the landing shock that are anticipated in practice. The side of the landing cushion facing away from the movement is tightened, causing the ground forces to be introduced into the fuselage of the aircraft or into the air load.

BRIEF DESCRIPTION OF THE DRAWINGS

The invention is described in detail below by way of an embodiment shown schematically in the drawings. Shown are in.

DETAILED DESCRIPTION OF THE INVENTION

Figure 1:
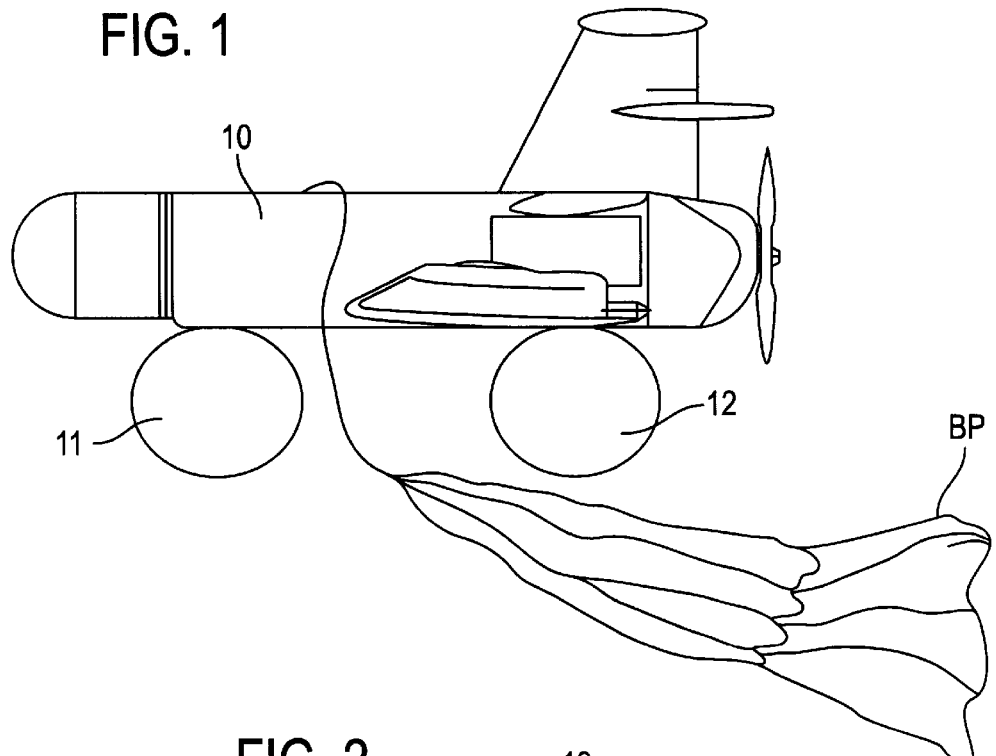
FIG. 1 a side view of a pilotless aircraft having an activated landing shock absorber, FIG. 2 a longitudinal section of a landing cushion of the landing shock absorber in FIG. 1, FIG. 3 an enlarged representation of cutout III in FIG. 2, and FIG. 4 an alternative of air-dropping a load with a parachute and landing cushion according to the invention is shown.

FIG. 1 shows a schematic, side view of a pilotless, reusable aircraft 10. For the landing process, the aircraft 10 or flying device is equipped with a brake parachute BP for reducing its falling speed, and a landing shock absorber for damping the impact upon the ground. The landing shock absorber comprises two landing cushions 11, 12, which are packed inside the aircraft 10 and are inflated for landing. The landing cushions 11, 12 are arranged such that they respectively lie against the underside of the nose and tail of the aircraft 10. The structures of the forward landing cushion 11 disposed near the nose and the rear landing cushion 12 disposed near the tail are identical; the structure of the forward landing cushion 11 is shown in detail in FIGS. 2 and 3.

Figure 2:
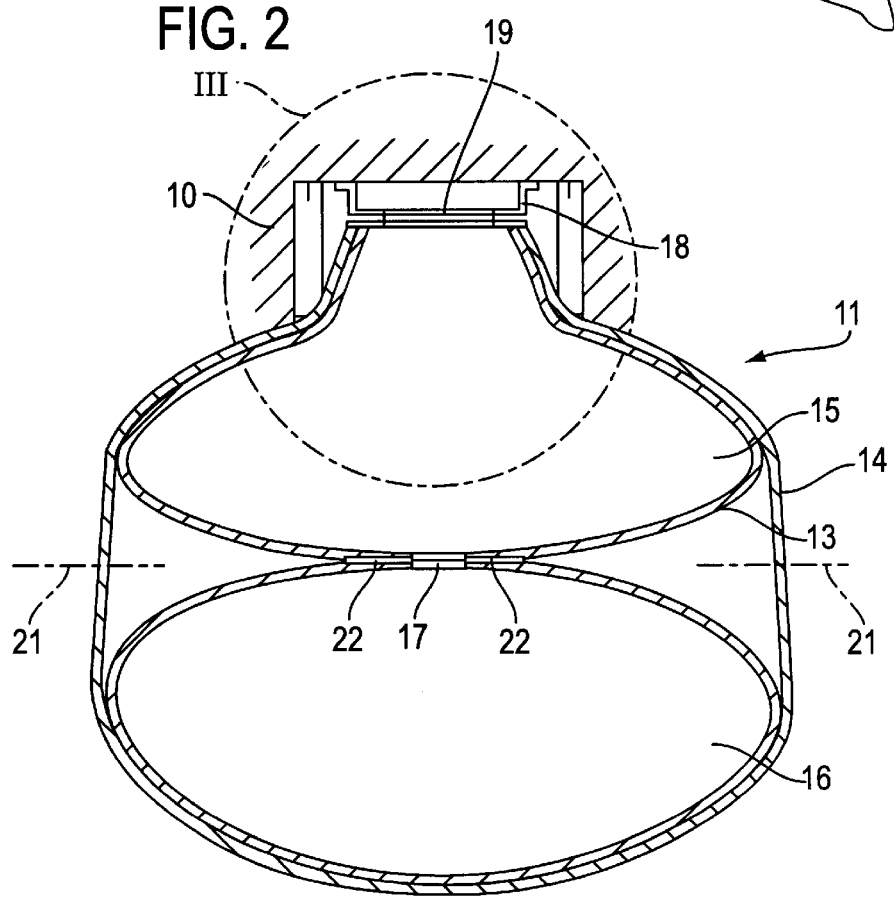
Figure 3:
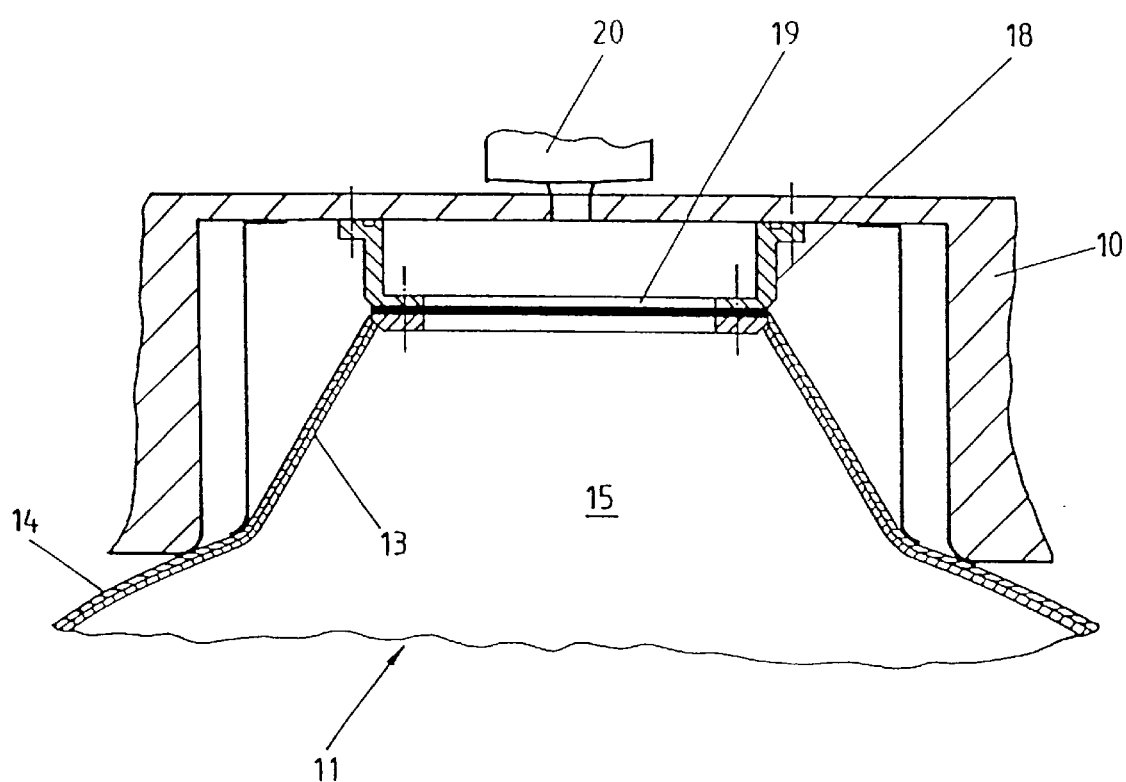

The landing cushion 11 has a clamshell design, and has an inner bag 13 and an outer bag 14 that encloses the inner bag. The inner bag 13 is subdivided into two air chambers 15, 16, which communicate via an opening 17. The inner bag 13 with its air chambers 15, 16 comprises a pressure-tight, plastically-deformable sheet, while the outer bag 14 is produced from a tear-resistant polyamide fabric that has low air permeability. The opening of both the inner bag 13 and the outer bag 14 are received in a central fastening device 18 (FIGS. 2 and 3) set up to secure the bags to the underside of the aircraft 10. The fastening device 18 has an inflation opening 19, which is surrounded in an airtight manner by the opening of the inner bag 13. The inner bag 13 is inflated with compressed gas that flows from a compressed-gas tank 20 (FIG. 3) through the inflation opening 19, with the two air chambers 15, 16 being filled taut and shaping the outer bag 14, whose volume is greater than the sum of the volumes of the inflated air chambers 15, 16, into a sort of cylinder (FIG. 2). The inner bag 13 is inflated with a low inflation pressure of only a few tenths of atmospheric overpressure. Tearing points 22 that rupture when pressure peaks occur in the air chambers 15, 16 are provided in the sheet of the inner bag 13. Throttle openings 21, which are indicated by dot-dash hole axes in FIG. 2, are provided in the fabric of the outer bag 14. The inner bag 13 and outer bag 14 are produced from a disk-shaped cut of a fabric run that is welded, in the case of the inner bag 13, and sewn, in the case of the outer bag 14, to form the balloon-like shape of the landing cushion 11. The throttle openings 21 are cut into the periphery of the outer bag 14, above the seam. The weld seams, which weaken the material, form the tearing points 22 of the individual air chambers 15, 16.

During the landing process, the landing cushions 11, 12 are tightly compressed by the landing shock when the aircraft 10 impacts upon the ground. A specific overpressure is built up in the inner bag 13 due to the impact energy. This overpressure causes the inner bag 13 to rupture at the tearing points formed by the weld seams, where the material is weakened, and the air flows out of the air chambers 15, 16 through the throttle openings 21 in the outer bag 14. Because the air exits through the throttle openings 21 in a controlled manner, a delay occurs that makes the damping process controllable. This prevents the aircraft 10 from bouncing or toppling during landing. The damping path can be influenced by the provision of two or more air chambers 15, 16 in the inner bag 13.

Figure 4:
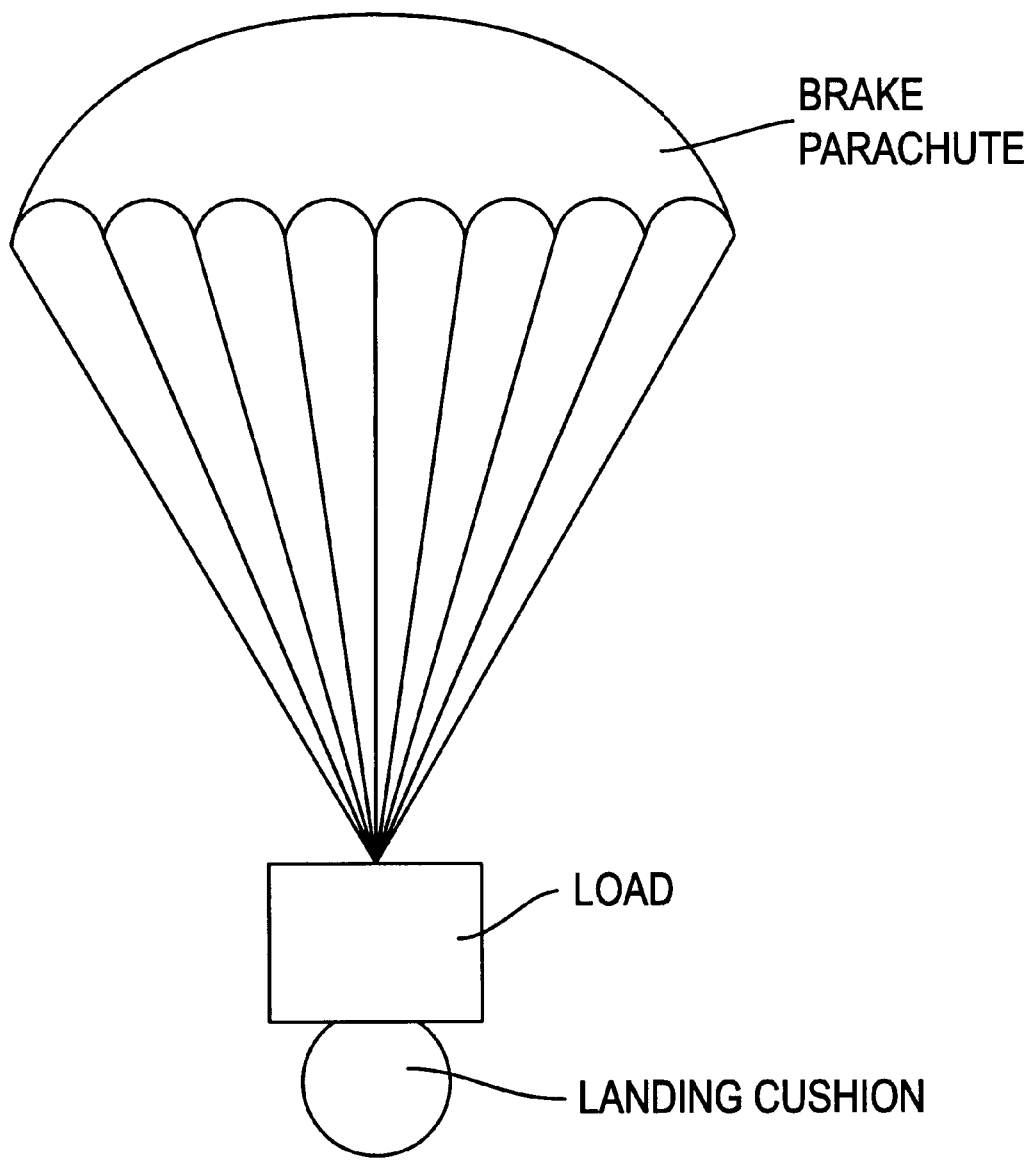

The invention is not limited to the described embodiment. The landing shock absorber can be secured in the same manner to air loads that are dropped from transport airplanes and fall to the ground with load parachutes as shown in FIG 4.

We claim:

1. A landing shock absorber for aircraft including brake parachutes and comprising a landing cushion for creating damping upon impact of the aircraft, the landing cushion having:
   an inflatable inner bag including a pressure-tight, plastically deformable sheet and defining:
      a plurality of inflatable air chambers; and
      at least one opening between the chambers for establishing communication between the chambers, said sheet having tearing regions adapted to rupture when pressure peaks occur in the inflatable air chambers; and
   an outer bag enclosing the inner bag and having a greater internal volume than an internal volume of the inflatable air chambers of the inner bag when the chambers are inflated, the outer bag including a tear-resistant fabric defining a plurality of throttle openings therein.

2. The landing shock absorber according to claim 1, wherein the fabric comprises polyamide.

3. The landing shock absorber according to claim 1, wherein the inflatable air chambers are inflated with filling pressure which is above atmospheric pressure by an order to tenths of a unit.

4. The landing shock absorber according to claim 1, wherein the landing cushion has a central fastening device defining an inflation opening therein for fastening the inner bag to an underside of the aircraft.

5. The landing shock absorber according to claim 1, further comprising one of a compressed-gas tank and a gas generator, wherein the inner bag is inflated with compressed gas from the one of the compressed gas tank and the gas generator.

6. A landing shock absorber for air loads which are dropped from transport airplanes including a brake parachute and comprising a landing cushion for creating damping upon impact of the air load, the landing cushion having:
   an inflatable inner bag including a pressure-tight, plastically deformable sheet and defining:
      a plurality of inflatable air chambers; and
      at least one opening between the chambers for establishing communication between the chambers, said sheet having tearing regions adapted to rupture when pressure peaks occur in the inflatable air chambers; and
   an outer bag enclosing the inner bag and having a greater internal volume than an internal volume of the inflatable air chambers of the inner bag when the chambers are inflated, the outer bag including a tear-resistant fabric defining a plurality of throttle openings therein.

* * * * *

UNITED STATES PATENT AND TRADEMARK OFFICE
CERTIFICATE OF CORRECTION

PATENT NO. : 5,944,282
DATED      : Aug. 31, 1999
INVENTOR(S) : CLAUSNITZER et al.

It is certified that error appears in the above-identified patent and that said Letters Patent is hereby corrected as shown below:

On the title page, insert the following:

ASSIGNEE:

STN Atlas Elektronik GmbH
Bremen, Germany ; and

ATTORNEYS:   VENABLE, George H. Spencer and Catherine M. Voorhees

Signed and Sealed this

Twenty-first Day of December, 1999

*Attest:*

Q. TODD DICKINSON

*Attesting Officer*           Acting Commissioner of Patents and Trademarks